(12) United States Patent
Cordery et al.

(10) Patent No.: US 7,649,658 B2
(45) Date of Patent: Jan. 19, 2010

(54) METHOD OF RECONSTRUCTING AN IMAGE

(75) Inventors: Robert A. Cordery, Danbury, CT (US);
Bertrand Haas, New Haven, CT (US);
Hongmei Gou, College Park, MD (US)

(73) Assignee: Pitney Bowes Inc., Stamford, CT (US)

( * ) Notice: Subject to any disclaimer, the term of this patent is extended or adjusted under 35 U.S.C. 154(b) by 575 days.

(21) Appl. No.: 11/636,802

(22) Filed: Dec. 11, 2006

(65) Prior Publication Data

US 2008/0137144 A1 Jun. 12, 2008

(51) Int. Cl.
*H04N 1/46* (2006.01)
*H04N 1/40* (2006.01)

(52) U.S. Cl. .................. 358/530; 358/448; 382/276; 382/289; 382/291

(58) Field of Classification Search .......... 358/448, 358/530; 382/289, 291, 276
See application file for complete search history.

(56) References Cited

U.S. PATENT DOCUMENTS

| | | | | |
|---|---|---|---|---|
| 6,594,403 B1 * | 7/2003 | Bozdagi et al. | ............ | 382/284 |
| 6,741,738 B2 * | 5/2004 | Taylor | ............ | 382/187 |
| 7,120,875 B2 * | 10/2006 | Daily et al. | ............ | 715/757 |
| 2003/0133589 A1 * | 7/2003 | Deguillaume et al. | ....... | 382/100 |

* cited by examiner

*Primary Examiner*—Benny Q Tieu
*Assistant Examiner*—Oleg Roytburd
(74) *Attorney, Agent, or Firm*—Ronald Reichman; Angelo N. Chaclas (57) ABSTRACT

A method of reconstructing an original image from a printed and scanned image includes determining a plurality of transformation parameters including a rotation $\alpha$ of the scanning grid relative to the printing grid and a plurality of translation parameters which give a position of a node on the printing grid in a coordinate system of the scanning grid, generating a system of non-linear equations which represent the printed and scanned image as a function of: (i) the original image, (ii) a print/scan resolution ratio, and (iii) the transformation parameters, computing coefficients for the system using the resolution ratio, the transformation parameters and the given print model, generating a linear approximation of the system of non-linear equations, solving the linear approximation for an approximation of the original image, and creating a reconstructed original image from the approximation of the original image.

10 Claims, 6 Drawing Sheets

METHOD OF RECONSTRUCTING AN IMAGE

FIELD OF THE INVENTION

The present invention relates to the printing and subsequent scanning of digital images, and in particular to a method of reconstructing an original digital image from a scanned digital image wherein the scanned digital image is created by printing the original digital image with a printer and scanning the printed image with a scanner.

BACKGROUND OF THE INVENTION

A number of applications exist in which an original digital image is printed with a printer at a given resolution and scanned with a scanner at a different (e.g., slightly finer) resolution and in a position that might be slightly rotated. For example, postal indicia typically begin as digital images that are printed onto a mailpiece by, for example, a mailer and that are later scanned with a scanner by, for example, a postal service such as the USPS. In addition, with the enactment of The Check Clearing for the 21$^{st}$ Century Act, which removed the legal requirement that an original paper check had to be presented to obtain payment, checks are more frequently being generated as digital images that are printed and then subsequently scanned and deposited as scanned images. The print-scan process that is performed in these and other similar circumstances transforms the original digital image into another digital image that typically has the same content as the original image as observed by human eyes. However, the print-scan process also introduces various distortions into the newly generated (scanned) image, such as geometric transformations (in particular rotation, scaling and translation) and pixel value changes due to, for example, blurring of adjacent pixels, gamma correction, etc., that cause it to differ from the original digital image. In many situations, such as reading small sized barcodes, it is advantageous to be able to reconstruct the original image from the distorted scanned image (resulting from a print-scan process) as accurately as possible. Reconstruction of the original digital image in this manner would greatly assist with a number of applications, including, without limitation, forensic analysis, copy and fraud detection, and increasing the readable density of printed information, among other things.

Current image reconstruction algorithms, while functional, are lacking as they do not take into account the position of the scanning grid used to scan the printed original image with respect to the printing grid used to print the original digital image. Such algorithms, while functional, thus lack a certain degree of accuracy. Furthermore, for black and white images scanned with a grey scale scanner, most current image reconstruction algorithms use a simple thresholding method and as a result do not yield satisfying results. Thus, there is a need for an improved method of reconstructing images in a situation where an original black and white image is printed with a grid printer (e.g., a dot matrix impact printer, an inkjet printer, or a thermal printer as opposed to an offset printer) and where the printed image is then scanned with a grey scale scanner having a resolution that may differ from the printer resolution.

SUMMARY OF THE INVENTION

The present invention provides a method of creating a reconstruction of an original image, such as a black and white image, from a printed and scanned image, wherein the printed and scanned image is generated by printing the original image according to a print model using a printer having a printing grid and a print resolution to create a printed original image and scanning the printed original image using a scanner, such as a grey scale scanner, having a scanning grid and a scan resolution. The method includes steps of obtaining the printed and scanned image and determining a plurality of transformation parameters including a rotation $\alpha$ of the scanning grid relative to the printing grid and a plurality of translation parameters which give a position of a node on the printing grid in a coordinate system of the scanning grid. The method further includes generating a system of non-linear equations which represent the printed and scanned image as a function of: (i) the original image, (ii) a ratio of resolutions of the print resolution and the scan resolution, and (iii) the plurality of transformation parameters, computing one or more coefficients for the system of non-linear equations using the resolution ratio, the plurality of transformation parameters and the print model, and generating a linear approximation of the system of non-linear equations. The linear approximation represents the printed and scanned image as a function of one or more of the one or more coefficients and an approximation of the original image. Finally, the method includes solving the linear approximation for the approximation of the original image, and creating a reconstructed original image from the approximation of the original image.

Preferably, the step of creating the reconstructed original image includes binarizing the approximation of the original image. The step of binarizing the approximation of the original image may include thresholding the approximation of the original image using a given, statistically determined threshold value.

In addition, the plurality of translation parameters preferably takes the form of a translation vector, such as a translation vector that includes a horizontal offset function for providing a plurality of first offset values in a horizontal direction and a vertical offset function for providing a plurality of second offset values in the vertical direction. Also, the print model preferably provides that printed black pixels in the printed original image are each represented by a black disk centered at a respective node in the printing grid.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
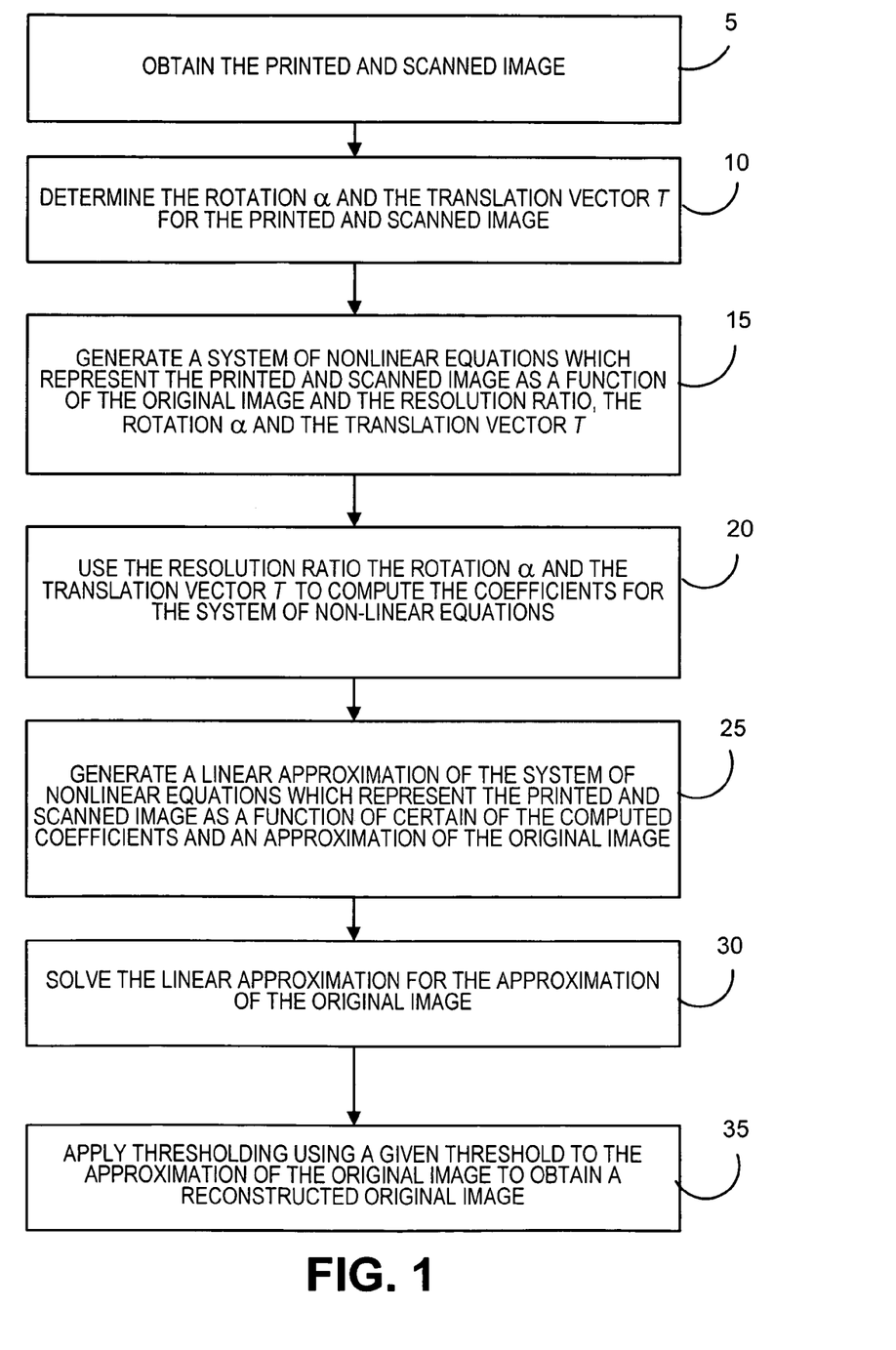
FIG. 1 is a flowchart of an image reconstruction method according to an embodiment of the present invention.
Figure 2:
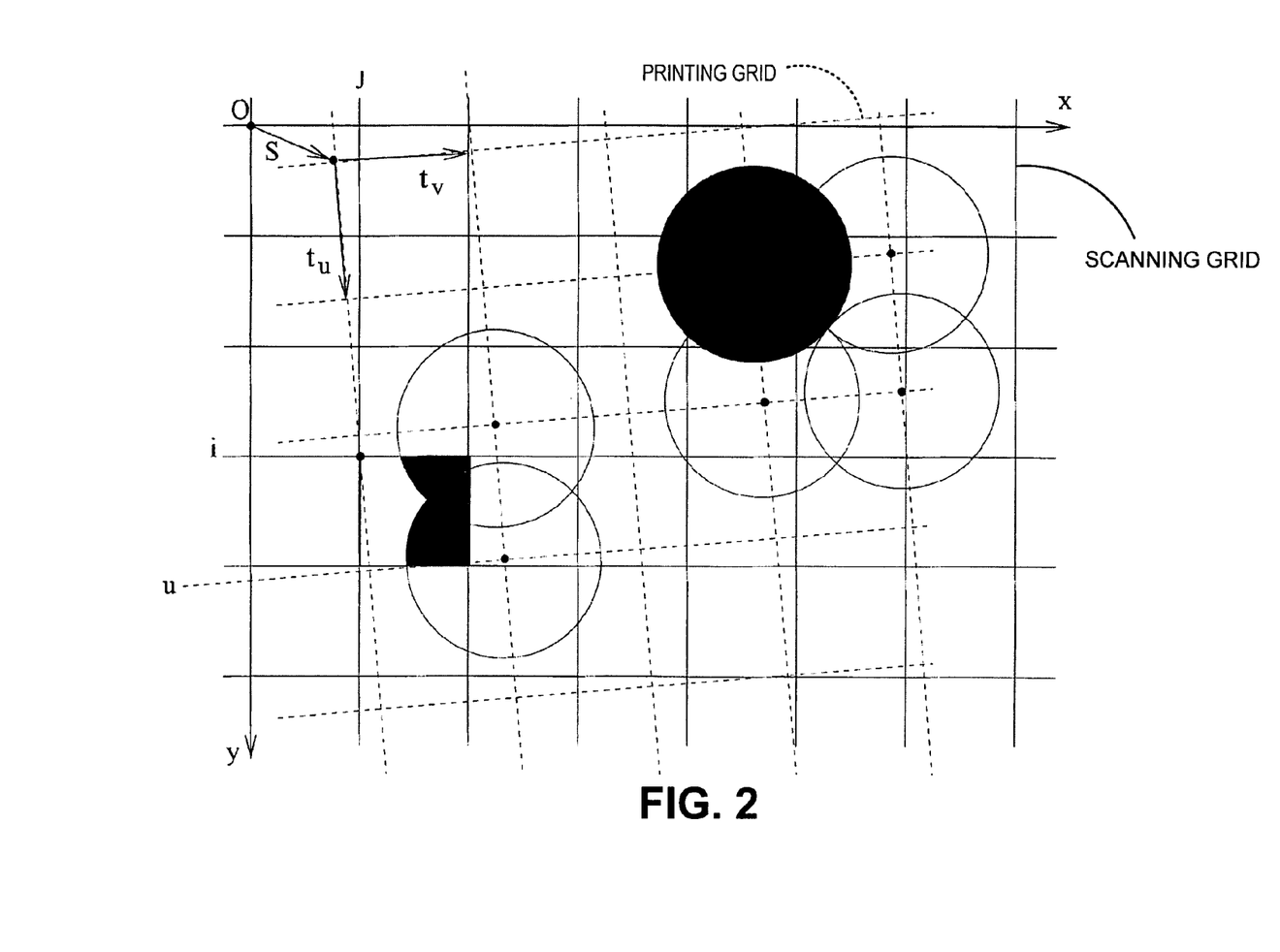
FIG. 2 is a schematic representation of a preferred print model employed in the method shown in FIG. 1.

FIG. 1 is a flowchart of an image reconstruction method according to an embodiment of the present invention. The method shown in FIG. 1 assumes that an original black and white (binary pixel values) digital image (e.g., a two dimensional barcode) has been printed with a grid printer having a print resolution to generate a printed original image and that the printed original image has then been scanned by a grey scale scanner having a scan resolution to create a printed and scanned image (in grey scale). The method shown in FIG. 1 also assumes a given print model for the printing process used to generate the printed original image. For example, in the preferred embodiment, the print model provides that printed black pixels are represented by black disks centered at the nodes of the printing grid of the printer as shown in FIG. 2 (which also shows the scanning grid of the scanner). As is known, the scanning grid of the scanner and the printing grid of the printer each typically comprise an array of square elements, with each element being a single pixel.

The method begins at step 5, wherein the printed and scanned image (in grey scale) is obtained. Next, at step 10, two parameters relating to the printed and scanned image are obtained. First, the rotation $\alpha$ of the scanning grid of the scanner used to create the printed and scanned image with respect to the printing grid of the printer that printed the printed original image is obtained. Second, translation parameters, preferably in the form of a translation vector T, which give the position of a node on the printing grid in the coordinate system of the scanning grid are obtained for the printed and scanned image. The translation parameters, preferably in the form of the translation vector T, will provide an offset value in both the X (horizontal) and Y (vertical) directions, and thus preferably includes an X (horizontal) offset function and a Y (vertical) offset function. Thus, the angle of rotation $\alpha$ and the translation parameters together serve to register the scanning grid with the printing grid. One particular preferred embodiment of a method of obtaining the rotation $\alpha$ and the translation parameters in the form of a translation vector T is described elsewhere herein in connection with FIGS. 3 to 8.

Next, at step 15, a system of non-linear equations is generated which represents the printed and scanned image as a function of the original image and the following parameters: (i) the ratio of resolutions of the printing grid and the scanning grid, which is known, (ii) the rotation $\alpha$ determined is step 10, and (iii) the translation parameters determined in step 10. Preferably, the printed and scanned image in this step is represented by a first matrix of grey scale values wherein each entry in the matrix corresponds to (and represents the grey scale value of) a pixel of the printed and scanned image. As will be appreciated, each of the grey scale values in this first matrix will be known from the output of the scanner (i.e., from the printed and scanned image obtained in step 5). Similarly, the original image in this step is represented by a second matrix wherein each entry in the matrix corresponds to a pixel of the original image (as described above, each pixel is either black or white). These values are not known, and instead, the method of the present invention shown in FIG. 1 provides a reconstruction of these values and thus a reconstruction of the original image. At step 20, the resolution ratio, the rotation $\alpha$, and the translation parameters, along with the given print model, are used to compute coefficients for the system of non-linear equations. Then, at step 25, a linear approximation of the system of non-linear equations (including the computed coefficients) is generated which represents the printed and scanned image as a function of certain of the computed coefficients and an approximation of the original image. The approximation of the original image is preferably represented by a third matrix wherein each entry in the matrix corresponds to (and is intended to represent the grey scale value of) a pixel of an approximation of the original image. Next, at step 30, the linear approximation generated in step 25 is solved for the approximation of the original image, which represents a first draft of the reconstructed original image. As will be appreciated, due to the linear approximation, the approximation of the original image will not be binary in nature, but instead will span a wide range and therefore requires binarization. The binarization may be provided by a simple thresholding method. Thus, once the approximation of the original image is obtained in this manner, then, at step 35, the approximation of the original image is thresholded using a given, pre-computed threshold to obtain the reconstructed original image.

One particular implementation of the method shown in FIG. 1 will now be described in detail. In that implementation, let the initial (original) black and white image B be represented by a $n_m$ row by $m_b$ column array with binary $\{0, 1\}$ entries $b_{uv}$ representing the pixels. Similarly the printed and scanned image C is represented by an $n_c$ row by $m_c$ column array with real entries $c_{ij} \in [0, 1]$. Moreover, assume that the scanning resolution is finer than the printing resolution, that is, $n_c > n_b$ and $m_c > m_b$.

The printed image will be represented in a system of coordinates (O,x,y), where the origin O corresponds to a given node of the scanning grid and the basis vectors correspond to the basis vectors of the scanning grid. The printed pixels are geometrically represented in the (O,x,y) plane by circular black dots centered on a (u,v)-lattice (the printing lattice) with minimal basis vectors $t_u$ and $t_v$ (see the print model shown in FIG. 2).

Furthermore, it is assumed that the printing lattice is square, that is, the print-head of the printer is perfectly perpendicular to the motion of the paper, and the motion of the paper is tuned so that the vertical and horizontal resolutions are identical. The radius of the dots is $\sqrt{2}/2 \|(t_u)\|$, that is, the minimum radius that does not leave a white spot in the center of a black 2 by 2 dot area (see FIG. 2).

Furthermore, the print-scan image C is modeled as follows: the grey level of the pixel $C_{ij}$ of the scanned image is equal to the black area inside the square with the point (i,j) as upper left corner. Let $I_{uv}$ be the function equal to 1 over the disk with center (u,v) and zero elsewhere. Let $w_{uv}(i,j)$, be the area contribution of the disk with center (u,v) to the square with upper left corner (i,j), that is, $$w_{uv}(i, j) = \int I_{u,v} dx dy \text{ over } i \leq x < i+1 \ \& \ j \leq y < j+1$$

Let $w_{uv}^{\epsilon_1,\epsilon_2}(ij)$, with $(\epsilon_1\epsilon_2)=(0,\pm1)$ or $(\pm1,0)$, be the area contribution of both the disks with centers (u,v) and (u+$\epsilon_1$,v+$\epsilon_2$) that is, $$w_{uv}^{\epsilon_1\epsilon_2}(i,j) = \int I_{uv} I_{u+\epsilon_1,v+\epsilon_2} dx dy \text{ over } i \le x < i+1, j \le y < j+1$$

The grey level $c_{ij}$ is therefore equal to the sum in equation (1) below:

$$c_{ij} = \sum w_{uv}(i,j)b_{uv} - \sum w_{uv}^{\epsilon_1,\epsilon_2}(i,j)b_{uv}b_{u+\epsilon_1,v+\epsilon_2}$$

With information about the geometric transformation parameters (scaling factor, rotation angle, horizontal/vertical translations that can be in sub-pixel precision as described elsewhere herein), the areas $w_{uv}(i,j)$ and $w_{uv}^{\epsilon_1,\epsilon_2}(i,j)$ in equation (1) can be easily calculated using known methods.

For the reconstruction problem, it assumed that the printed and scanned image C is given, and it is further assumed that the position of the printing grid with respect of the scanning grid, i.e., the geometric transformation parameters, is known at a subpixel accuracy, that is at a finer accuracy than the pixel accuracy associated with the scanner resolution. The problem is to find the initial (original) image B. From equation (1), a system of nonlinear equations giving C in function of B is provided that therefore needs to be solved. This is a redundant system of $n_c m_c$, equations, indexed by the (i,j)'s, in $n_b m_b$ unknowns $b_{uv}$. The terms consist of linear terms (the $w_{uv}(i,j) b_{uv}$'s) and quadratic terms (the $w_{uv}^{\epsilon_1,\epsilon_2}(i,j)b_{uv}b_{u+\epsilon_1,v+\epsilon_2}$'s ). Moreover this is a sparse system since there are at most 4 non-zero coefficients $w_{uv}(i,j)$ and 4 non-zero $w_{uv}^{\epsilon_1,\epsilon_2}(i,j)$ per (i,j)-row.

Although it is possible to solve these nonlinear equations, such as using Groebner bases, solving a nonlinear system of a large number of equations ($n_c m_c$) with a large number of unknowns $n_m m_b$ is quite complicated. By observing that the intersection areas $w_{uv}^{\epsilon_1,\epsilon_2}(i,j)$ are generally small compared with the circle areas $w_{uv}(i,j)$, the nonlinear terms in equation (1) may be ignored to reconstruct an approximate $B'=\{b'_{uv}\}$ of the original image through solving a set of linear equations (2) below:

$$c_{ij} = \sum w_{uv}(i,j) U_{uv} \qquad (2)$$

Equations in (2) can be easily solved by using such classic methods as least-squares, and efficient algorithms generally exist for our sparse system, e.g., using Matlab function lsqr( ). However, due to the linear approximation, $b'_{uv}$ is no longer a binary value but spans in a wide range and requires binarization processing. A simple thresholding method can be used to do the binarization, but it is of utmost importance to determine an appropriate threshold value. A statistical way to determine the binarization threshold is described below.

To determine the binarization threshold, n pseudo-random binary images, in which black and white pixels occur with the same probability, are used as the training set. For each training image B, its print-scan version C is generated according to equation (1). Then, a gray-scaled B' is constructed by solving equation (2). As the specific number of ones/zeros for each training image B is known, the reconstructed gray-scaled $B'=\{b'_{uv}\}$ may be classified into two sets: a lower set $B'_L$ and an upper set $B'_u$, which will be binarized to zeros and ones, respectively. Further, the upper bound $u_{Bi}=\max B'_L$ of the lower set and the lower bound $\iota_{B_u}=\min B'_u$ of the upper set are identified. Collecting $u_{B_L}$ and $\iota_{B_u}$ for all the n training images (n=1×10$^5$ in one test that was performed), it is observed that $\{u_{B_L}\}$ and $\{\iota_{B_u}\}$ are well separated from each other and follow two Gaussian distributions of $N(\mu_1,\sigma_1^2)$ and $N(\mu_2,\sigma_2^2)$.

The error probability $P_e = P_{0\to1} + P_{1\to0}$ is defined. When considering only the contribution from the upper bound of the lower set $\{u_{B_L}\}$ and the lower bound of the upper set $\{\iota_{B_u}\}$, a lower bound of the error probability $P_e$ can be minimized by making the threshold x satisfy the following equation (3):

$$\frac{1}{\sqrt{2\pi\sigma_1^2}} e^{-\frac{(s-\mu_1)^2}{2\sigma_1^2}} = \frac{1}{\sqrt{2\pi\sigma_2^2}} e^{-\frac{(s-\mu_2)^2}{2\sigma_2^2}}.$$

The probability of an upper bound $u_{B1}$ is greater than the threshold x determined above and that of a lower bound $\iota_{Bu}$ is smaller than x are quite small. As a large portion of the errors come from the upper bounds $\{u_{B_L}\}$ and the lower bounds $\{u_{B_L}\}$, equation (3) provides us an effective and theoretically simple way to determine the binarization threshold.

Figure 3:
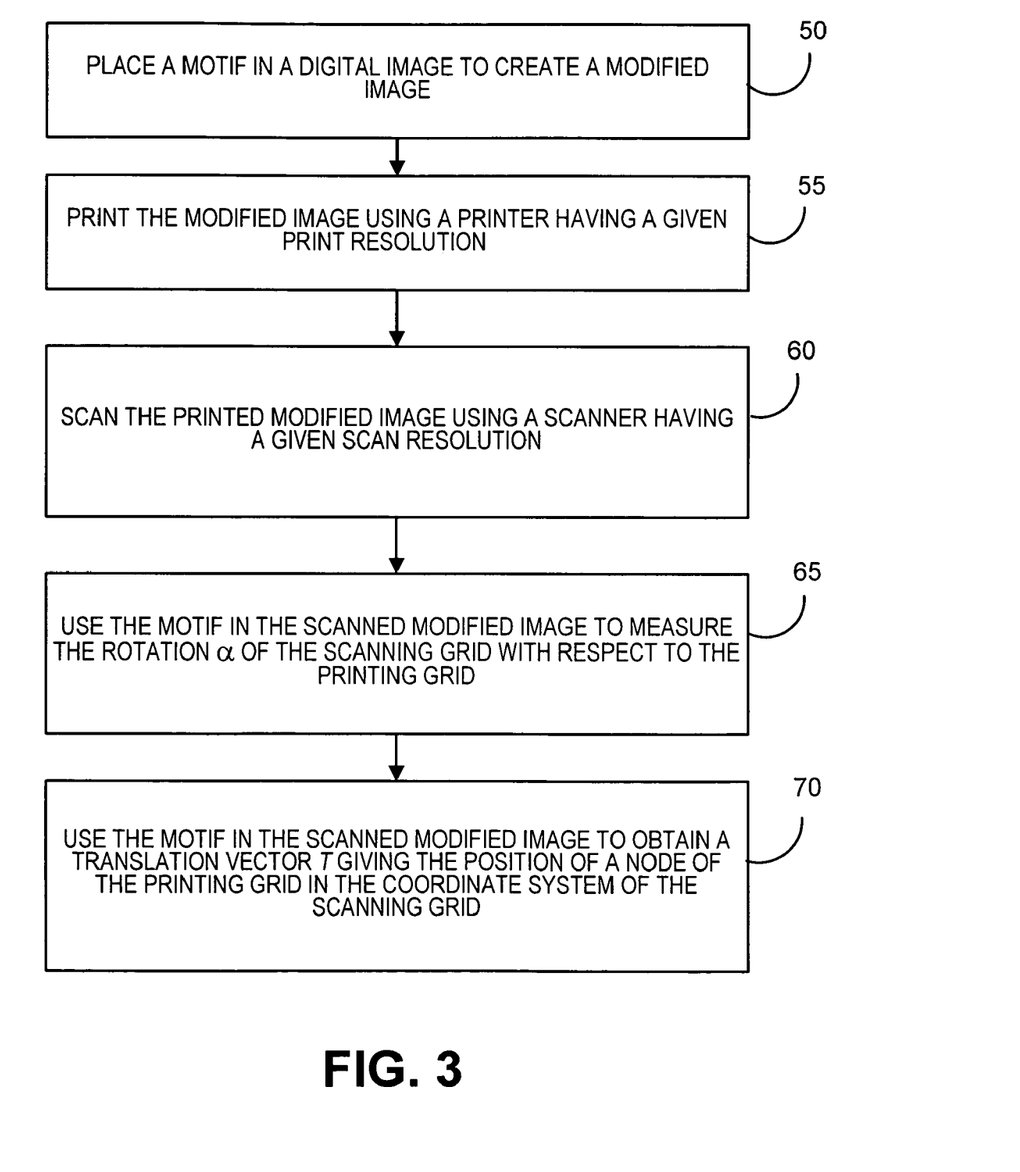
FIG. 3 is a flowchart of a method of registering a scanning grid of a scanner having a given scan resolution with a printing grid of a printer having a given print resolution that may be employed in implementing the method shown in FIG. 1.

FIG. 3 is a flowchart of a method of registering a scanning grid of a scanner having a given scan resolution with a printing grid of a printer having a given print resolution that may be employed in the method shown in FIG. 1 to obtain the rotation $\alpha$ and the translation vector T. As is known, the scanning grid and the printing grid each typically comprise an array of square elements, with each element being a single pixel. The method begins at step 50, wherein a predetermined pattern, referred to herein as a motif, is electronically placed in a digital image to create a modified image. Next, at step 55, the modified image is printed using the printer described above. At step 60, the printed modified image (which includes the original digital image and the motif added thereto) is then scanned using the scanner described above to create a scanned modified image. As will be appreciated, the scanned modified image will include both the original digital image and the added motif. Next, at step 65, the motif in the scanned modified image is used to measure the rotation $\alpha$ of the scanning grid of the scanner used to create the scanned image in step 60 with respect to the printing grid of the printer that printed the printed modified image in step 55. Finally, in step 70, the motif in the scanned modified image is used to obtain a translation vector T which gives the position of a node on the printing grid in the coordinate system of the scanning grid. The translation vector T will provide an offset value in both the X and Y directions, and thus preferably includes an X offset function and a Y offset function. Thus, the angle of rotation $\alpha$ and the translation vector T together serve to register the scanning grid with the printing grid.

Figure 4:
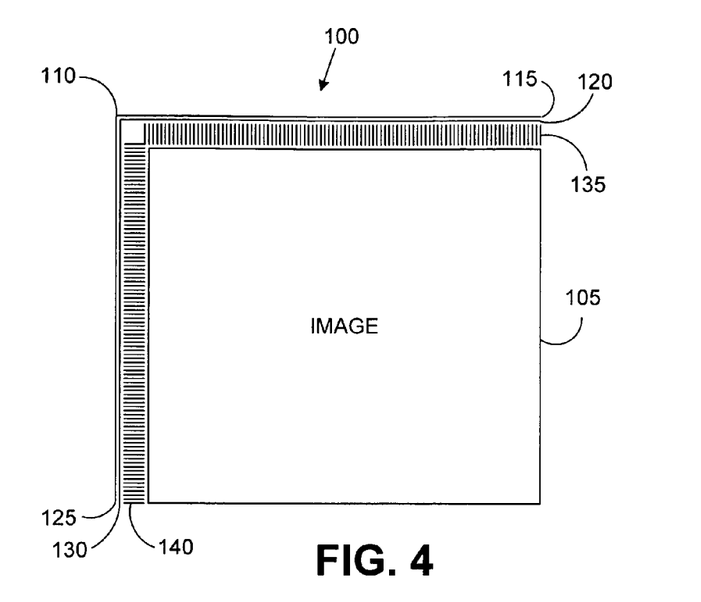
FIG. 4 is a schematic representation of a modified image that may be used in a preferred implementation of the method shown in FIG. 3.

FIG. 4 is a schematic representation of a modified image 100 that may be used in a preferred implementation of the method shown in FIG. 3. As seen in FIG. 4, the modified image 100 includes an original image portion 105 and a preferred motif 110 provided along at least a portion of the left and upper edges of the original image portion 105. The motif 110 includes first and second elongated horizontal lines 115 and 120 (parallel to one another) along the upper edge of the original image portion 105 and first and second elongated vertical lines 125 and 130 (parallel to one another) along the left edge of the original image portion 105. In addition, the motif 110 further includes a series of short vertical line segments (parallel to one another) 135 along the upper edge of the original image portion 105 and a series of short horizontal line segments (parallel to one another) 140 along the left edge of the original image portion 105.

Figure 5:
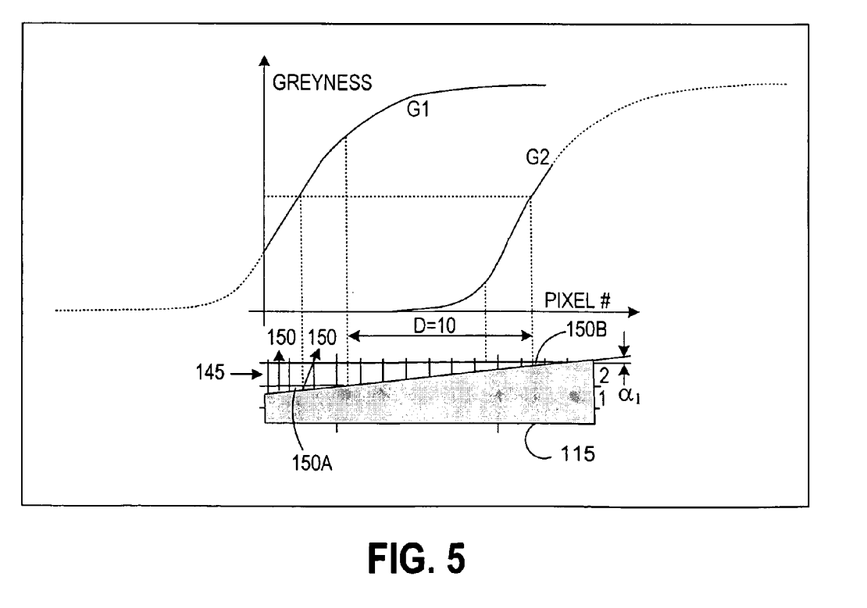
FIG. 5 is a schematic representation of a portion of the scanning grid and a portion of the modified image and the greyness graph that may be used to implement a portion of an embodiment of the method of FIG. 3.

According to one particular embodiment, the first and second elongated horizontal lines 115 and 120 and the first and second elongated vertical lines 125 and 130 may be used to perform step 65 of the method shown in FIG. 3, i.e., to measure the rotation α of the scanning grid relative to the printing grid when the modified image 100 is printed and scanned as in steps 55 and 60 shown in FIG. 3. FIG. 5 shows a portion of the scanning grid 145 including a plurality of pixels 150. The portion of the scanning grid 145 shown in FIG. 5 includes certain of the pixels 150 from a row 1 and a row 2 of the scanning grid 145. FIG. 5 also shows a portion of the elongated horizontal line 115 of the motif 110 as scanned by the scanner (step 60 in FIG. 3). As seen in FIG. 5, the elongated horizontal line 115 is positioned at an angle $\alpha_1$ with respect to the longitudinal axis of the rows 1 and 2 of the scanning grid 145. As explained herein, that angle $\alpha_1$ may be used to determine the rotation α of the scanning grid with respect to the printing grid (step 65 shown in FIG. 3).

According to an aspect of the method, the angle $\alpha_1$ may be determined in the following manner. First, a greyness curve for row 1 and row 2 (G1 and G2, respectively) is calculated and plotted as shown in FIG. 5. In each case, the greyness curve is a plot of the measured greyness (from the scanned image) on the Y-axis versus the pixels in the respective row on the X-axis. In other words, the greyness curve provides a greyness value (Y-axis) ranging from 0 to 1 for each pixel 150 (X-axis) in the row of the scanning grid in question. In the preferred embodiment, the greyness value for each pixel is determined by the following formula: greyness=1−(the grey level of the scanned pixel in question), wherein the grey levels for each pixel have been converted from a 0 to 255 scale to a 0 to 1 scale (by dividing each grey scale value by 255), and wherein a grey scale value of 0 is black and a grey scale value of 1 is white. The next step in determining the angle $\alpha_1$ involves measuring a horizontal distance D that is equal to the number of pixels between a first pixel in row 1 (e.g., pixel 150A in FIG. 5) having a pre-selected greyness value (e.g., 0.5) and a second pixel in row 2 (e.g., pixel 150B in FIG. 5) having the same pre-selected greyness value (e.g., 0.5). The angle $\alpha_1$ may then be determined according to the following formula: $\alpha_1 = \pi/2 - \arctan(D)$. In addition, the rows 1 and 2 need not be directly adjacent to one another (as shown in FIG. 5), but instead may be separated from one another by a number of pixels equal to d. In such a case, the formula that is used is as follows: $\alpha_1 = \pi/2 - \arctan(D/d)$. In the preferred embodiment, this process is repeated for the elongated horizontal line 120 to obtain an angle $\alpha_2$ and for the elongated vertical lines 125 and 130 (in which case rows of pixels are switched for columns of pixels in the processing) to obtain angles $\alpha_3$ and $\alpha_4$. The angles $\alpha_1$, $\alpha_2$, $\alpha_3$, and $\alpha_4$ may then be averaged to obtain the rotation α of the scanning grid with respect to the printing grid. Alternatively, any one of the angles $\alpha_1$, $\alpha_2$, $\alpha_3$, or $\alpha_4$ may be measured alone and used for the rotation α of the scanning grid with respect to the printing grid. As a further alternative, any sub-combination of two or more of the angles $\alpha_1$, $\alpha_2$, $\alpha_3$, and $\alpha_4$ may be measured and averaged to obtain the rotation α of the scanning grid with respect to the printing grid.

Figure 6:
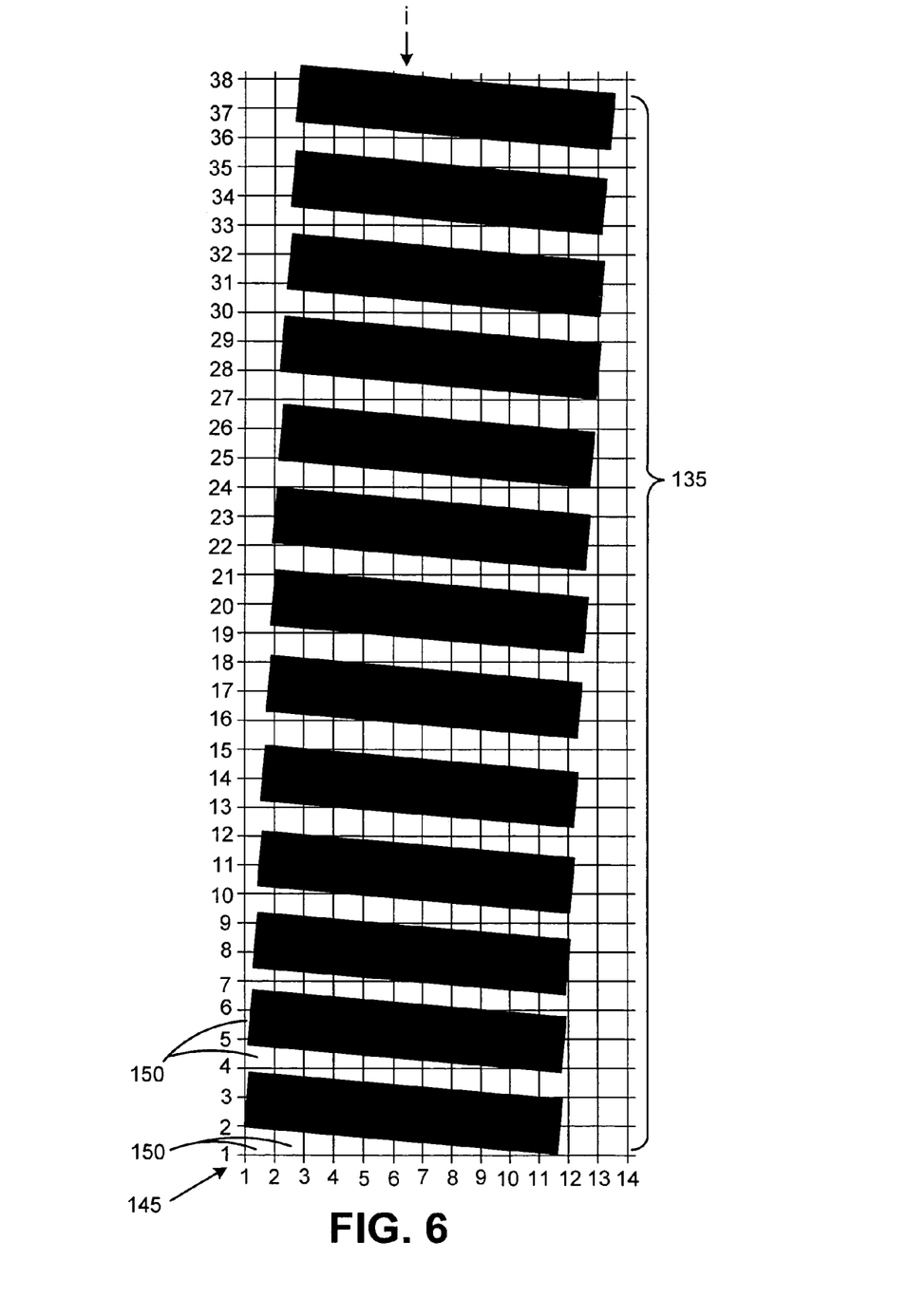
FIG. 6 is a schematic representation of a different portion of the scanning grid and a different portion of the modified image that may be used to implement a different portion of an embodiment of the method of FIG. 3.

According to another particular embodiment, the short vertical line segments 135 and the short horizontal line segments 140 of the motif 110 may be used to perform step 70 of the method shown in FIG. 3, i.e., to determine the translation vector T which gives the position of a node on the printing grid in the coordinate system of the scanning grid. FIG. 6 shows a portion of the scanning grid 145 including a plurality of pixels 150. The portion of the scanning grid 145 shown in FIG. 6 includes certain of the pixels 150 from rows 1 through 14 and from columns 1 through 38 of the scanning grid 145. FIG. 6 also shows a number of the short vertical line segments 135 of the motif 110 as scanned by the scanner (step 60 in FIG. 3).

Figure 7:
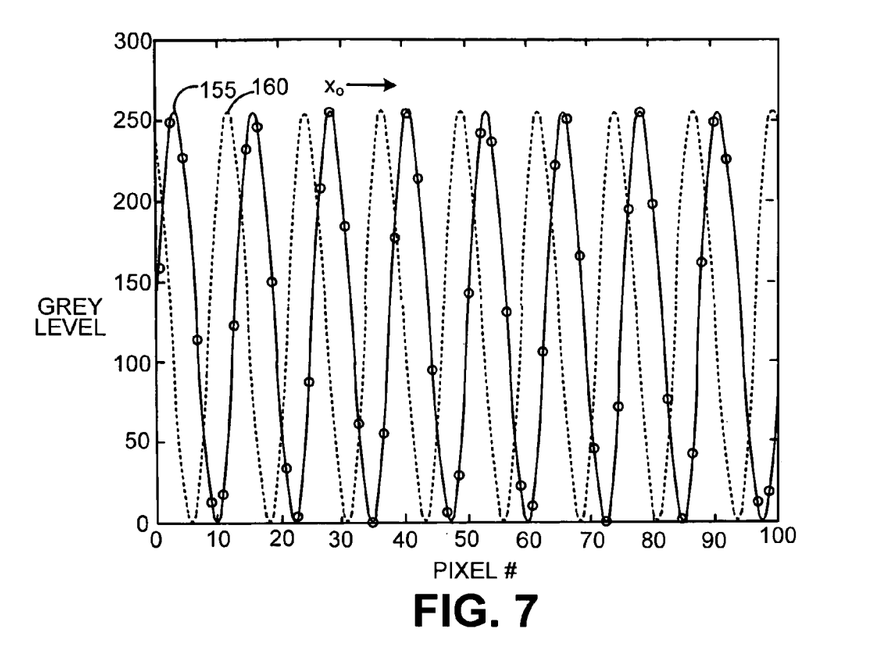
FIG. 7 shows a plot of grey levels versus pixels that may be utilized in a portion of an embodiment of the method of FIG. 3.
Figure 8:
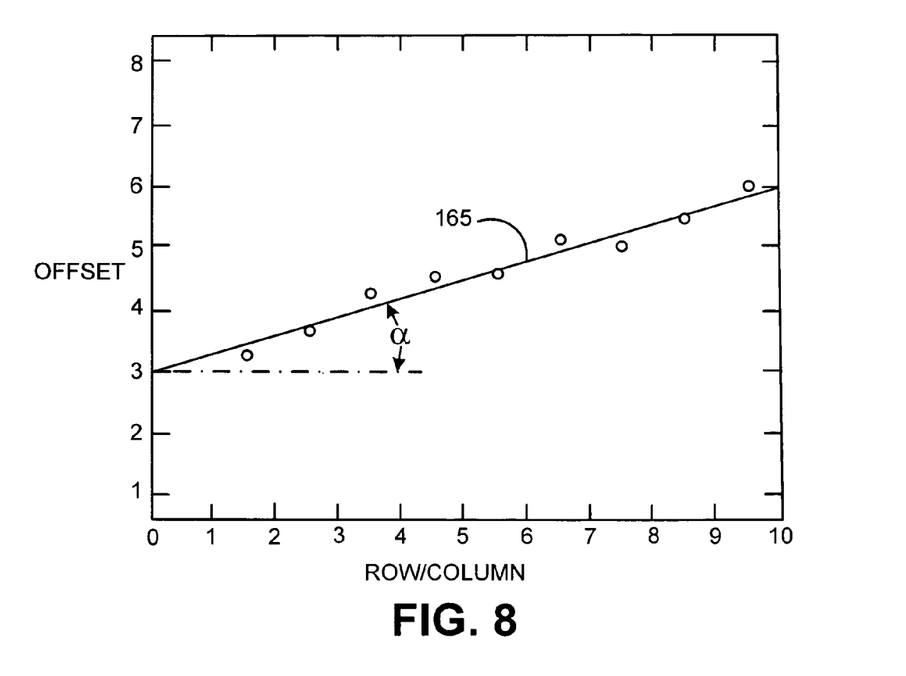
FIG. 8 shows a plot of offset values and an offset function determined according to a portion of an embodiment of the method of FIG. 3.

According to one particular embodiment, the translation vector T may be determined as follows. First, a row i of pixels 150 is selected. As seen in FIG. 6, row i is the sixth row of pixels. Then, as seen in FIG. 7, the grey level for each pixel 150 in the selected row i is plotted and a curve 155 is fit thereto. Next, an ideal curve 160 is plotted adjacent to the curve 155 which represents that grey level curve that would have resulted for the selected row i had the printing grid and the scanning grid been perfectly aligned with one another. As will be appreciated by those of skill in the art, this ideal curve may be determined from the print model for the printing of the printed modified image (step 55 in FIG. 3) and the known width of and separation between each of the short vertical line segments 135. From the curve 155 and the ideal curve 160, an X-direction offset for the selected row i may be determined (shown as $X_o$ in FIG. 7). This process may then be repeated for a number of different selected rows, and each measured offset may be plotted as shown in FIG. 8. A best fit (least square) X-direction offset function 165 may then be determined based on the plotted offset values. Moreover, the steps just described may then be repeated using the short horizontal line segments 140 (with selected columns being substituted for selected rows) to obtain a best fit (least square) Y-direction offset function 165. The X-direction and Y-direction offset functions 165 may then be used to determine an X-direction offset and a Y-direction offset for a given node in the printing grid. In other words, given a node in the printing grid identified by a particular row and column, the appropriate X-direction and Y-direction offsets to be used to determine the position of that node in the scanning grid may be determined from the X-direction and Y-direction offset functions 165. In addition, the rotation α of the scanning grid with respect to the printing grid may also be determined by measuring the angle of either the X-direction offset function 165 or the Y-direction offset function 165 with respect to the X (horizontal) axis in the function as shown in FIG. 8. In one particular embodiment, the rotation α of the scanning grid with respect to the printing grid may be determined by measuring the angle of both the X-direction offset function 165 and the Y-direction offset function 165 with respect to the X (horizontal) axis in the function and then averaging the two measured angles.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of creating a reconstruction of an original image from a printed and scanned image, said printed and scanned image being generated by printing said original image according to a print model using a printer having a printing grid and a print resolution to create a printed original image and scanning said printed original image using a scanner having a scanning grid and a scan resolution, the method comprising:

obtaining said printed and scanned image;

determining a plurality of transformation parameters including a rotation α of said scanning grid relative to said printing grid and a plurality of translation parameters which give a position of a node on the printing grid in a coordinate system of the scanning grid;

generating a system of non-linear equations which represent said printed and scanned image as a function of: (i) said original image, (ii) a resolution ratio of said print resolution to said scan resolution, and (iii) said plurality of transformation parameters;

computing one or more coefficients for said system of non-linear equations using said resolution ratio, said plurality of transformation parameters and said print model;

generating a linear approximation of said system of non-linear equations, said linear approximation representing said printed and scanned image as a function of one or more of said one or more coefficients and an approximation of said original image;

solving said linear approximation for said approximation of said original image; and creating a reconstructed original image from said approximation of said original image.

2. The method according to claim 1, wherein said step of creating said reconstructed original image comprises binarizing said approximation of said original image.

3. The method according to claim 2, wherein said step of binarizing said approximation of said original image comprises thresholding said approximation of said original image.

4. The method according to claim 3, wherein said step of thresholding said approximation of said original image employs a given, statistically determined threshold value.

5. The method according to claim 1, wherein said plurality of translation parameters comprise a translation vector.

6. The method according to claim 5, wherein said translation vector includes a horizontal offset function for providing a plurality of first offset values in a horizontal direction and a vertical offset function for providing a plurality of second offset values in the vertical direction.

7. The method according to claim 1, wherein said print model provides that printed black pixels in said printed original image are each represented by a black disk centered at a respective node in said printing grid.

8. The method according to claim 1, wherein said original image is a black and white image.

9. The method according to claim 1, wherein said scanner is a grey scale scanner and wherein said printed and scanned image is a grey scale image.

10. The method according to claim 9, wherein said scan resolution is finer than said print resolution.

* * * * *